United States Patent
Pichumani et al.

(10) Patent No.: US 8,339,973 B1
(45) Date of Patent: Dec. 25, 2012

(54) MULTICAST TRACEROUTE OVER MPLS/BGP IP MULTICAST VPN

(75) Inventors: Swaminathan Pichumani, Santa Clara, CA (US); Rahul Aggarwal, San Francisco, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 295 days.

(21) Appl. No.: 12/876,871

(22) Filed: Sep. 7, 2010

(51) Int. Cl.
H04L 12/26 (2006.01)
(52) U.S. Cl. .......................................... 370/248
(58) Field of Classification Search .......... None
See application file for complete search history.

(56) References Cited

U.S. PATENT DOCUMENTS

| | | |
|---|---|---|
| 6,173,411 B1 | 1/2001 | Hirst et al. |
| 6,507,869 B1 | 1/2003 | Franke et al. |
| 6,618,360 B1 | 9/2003 | Scoville et al. |
| 6,850,253 B1 | 2/2005 | Bazerman et al. |
| 6,862,288 B2 | 3/2005 | Sharma et al. |
| 6,982,953 B1 | 1/2006 | Swales |
| 7,068,624 B1 | 6/2006 | Dantu et al. |
| 7,120,693 B2 | 10/2006 | Chang et al. |
| 7,219,030 B2 | 5/2007 | Ohtani |
| 7,336,615 B1 | 2/2008 | Pan et al. |
| 7,391,719 B2 | 6/2008 | Ellis et al. |
| 7,463,591 B1 | 12/2008 | Kompella et al. |
| 7,471,638 B2 | 12/2008 | Torrey et al. |
| 7,523,185 B1 | 4/2009 | Ng et al. |
| 7,639,624 B2 | 12/2009 | McGee et al. |
| 7,724,677 B2 | 5/2010 | Iwami |
| 2001/0033574 A1 | 10/2001 | Enoki et al. |
| 2002/0004843 A1 | 1/2002 | Andersson et al. |
| 2002/0030864 A1 | 3/2002 | Chaudhuri et al. |
| 2002/0093954 A1 | 7/2002 | Weil et al. |
| 2002/0176415 A1 | 11/2002 | Holden et al. |
| 2003/0063560 A1 | 4/2003 | Jenq et al. |
| 2003/0112749 A1 | 6/2003 | Hassink et al. |
| 2005/0259634 A1 | 11/2005 | Ross |

(Continued)

FOREIGN PATENT DOCUMENTS

EP    1367750 A1    12/2003

OTHER PUBLICATIONS

Fenner et al., "A "traceroute" facility for IP Multicast," Internet Engineering Task Force, draft-fenner-traceroute-ipm-01.txt.

(Continued)

*Primary Examiner* — Anh-Vu Ly
(74) *Attorney, Agent, or Firm* — Shumaker & Sieffert, P.A.

(57) ABSTRACT

The subject matter of this specification can be implemented in, among other things, a method that includes receiving, at a first network device that is associated with an MVPN, an mtrace message that identifies a source device that is associated with the MVPN and that is separated from the first network device by an MPLS network. The method further includes determining an LSP from the first network device to a second network device that is associated with the MVPN and that is separated from the first network device by the MPLS network. The method further includes adding an IP header to the mtrace message, the IP header including a destination address set to a localhost loopback IP address. The method further includes encapsulating the mtrace message with an MPLS label stack that causes the encapsulated mtrace message to reach an instance of the MVPN on the second network device.

26 Claims, 6 Drawing Sheets

U.S. PATENT DOCUMENTS

| | | | |
|---|---|---|---|
| 2005/0281192 A1 | 12/2005 | Nadeau et al. | |
| 2006/0095499 A1 | 5/2006 | Luciani et al. | |
| 2006/0095538 A1 | 5/2006 | Rehman et al. | |
| 2006/0198321 A1 | 9/2006 | Nadeau et al. | |
| 2007/0041554 A1 | 2/2007 | Newman et al. | |
| 2007/0061103 A1 | 3/2007 | Patzschke et al. | |
| 2007/0192501 A1 | 8/2007 | Kompella | |
| 2007/0220252 A1 | 9/2007 | Sinko | |
| 2008/0080507 A1 | 4/2008 | Swallow et al. | |
| 2009/0019141 A1 | 1/2009 | Bush et al. | |
| 2009/0028155 A1* | 1/2009 | Chen et al. | 370/392 |
| 2009/0086644 A1 | 4/2009 | Kompella et al. | |
| 2011/0286456 A1* | 11/2011 | Kompella | 370/390 |
| 2012/0176934 A1* | 7/2012 | Farinacci et al. | 370/254 |

OTHER PUBLICATIONS

Asaeda et al., "Mtrace Version 2: Traceroute Facility for IP Multicast," MBONED Working Group, draft-ietf-mboned-mtrace-v2-06.

Rosen et al., RFC 4364, BGP/MPLS IP Virtual Private Networks (VPNs), Network Working Group, Feb. 2006, 23 pp.

Andersson et al., RFC 4026, "Provider Provisioned Virtual Private Network (VPN) Terminology," Network Working Group, Mar. 2005, 17 pp.

Rosen et al., "Multicast in MPLS/BGP IP VPNs," Network Working Group, draft-ietf-l3vpn-2547bis-mcast-l0.txt, Jan. 28, 2010, 89 pp.

Kompella et al., "Detecting Multi-Protocol Label Switched (MPLS) Data Plane Failures," Feb. 2006, Network Working Group, RFC 4379, 43 pp.

Awduche et al., "RSVP-TE: Extensions to RSVP for LSP Tunnels," RFC 3209, IETF, Dec. 2001, 52 pp.

Atlas, "ICMP Extensions for Unnumbered Interfaces," draft-atlas-icmp-unnumbered-00.txt, Dec. 9, 2005, 8 pp.

Atlas, "ICMP Extensions for Unnumbered Interfaces," draft-atlas-icmp-unnumbered-00.txt, Feb. 2006, 8 pp.

Sun, "Advanced TCP Port Scan and Its Response," O.I. Automation 2005, vol. 24, No. 4, Apr. 24, 2005, http://www.cnki.net, 2pp., abstract only.

Bonica et al., "Generic Tunnel Tracing Protocol (GTTP) Specification," IETF, Jul. 2001, XP015011025, 20 pp.

Berkowitz, "Router Renumbering Guide," IETF, RFC 2072, Jan. 1997, XP015007856, 41 pp.

Mannie, "Generalized Multi-Protocol Label Switching Architecture," IETF, May 2003, XP015001499, 56 pp.

Kompella, "Signalling Unnumbered Links in Resource ReSerVation Protocol-Traffic Engineering (RSVP-TE)," IETF, Jan. 2003, RFC 3477, XP015009260, 8 pp.

Zvon—RFC 2072 [Router Renumbering Guide]—Router Identifiers, Chapter 8.3 Unnumbered Interfaces, www.zvon.org/tmRFC/RFC2072/Output/chapter8.html, last printed Nov. 7, 2005, 2 pgs.

"ICMP (Internet Control Message Protocol)," Data Network Resource, www.rhyshaden.com/icmp.html, last printed Nov. 10. 2005, 4 pgs.

"Using the IP unnumbered configuration FAQ," APNIC, www.apnic.net/info/faq/ip_unnumb.html, Jul. 1, 2005, 2 pgs.

"Traceroute," Webopedia, www.webopedia.com/TERM/t/traceroute.html, Aug. 26, 2004, 1 pg.

"RFC 2151—(rfc2151)—A Primer on Internet and TCP/IP Tools and Utilities," www.rfcsearch.org/rfcview/RFC/2151.html, last printed Nov. 9, 2005, 3 pgs.

Fairhurst, "Internet Control Message Protocol," Internet Control Message Protocol (ICMP), www.erg.abdn.ac.uk/users/gorry/course/inet-pages/icmp.html, last printed Sep. 6, 2006, 3 pgs.

"ActiveXperts PING backgrounds (PING is part of the ActiveSocket Toolkit)," ActiveSocket Network Communication Toolkit 2.4, Activexperts, www.activexperts.com/activsocket/toolkits/ping.html, last printed Nov. 10, 2005, 3 pgs.

Mukhi et al., "Internet Control Message Protocol ICMP," www.vijaymukhi.com/vmis/icmp, last printed Sep. 6, 2006, 5 pgs.

"Configure the Loopback Interface," www.juniper.net/techpubs/software/junos/junos56/index.html, last printed Nov. 7, 2005, 2 pgs.

"Configure an Unnumbered Interface," www.juniper.net/techpubs/software/junos/junos56/index.html, last pritned Nov. 7, 2005, 1 pg.

U.S. Appl. No. 11/848,780, by Nitin Bahadur, filed Aug. 31, 2007.

* cited by examiner

MULTICAST TRACEROUTE OVER MPLS/BGP IP MULTICAST VPN

TECHNICAL FIELD

This disclosure relates to computer networks, and more particularly, to tracing multicast traffic flows within computer networks.

BACKGROUND

A computer network is a collection of interconnected computing devices that exchange data and share resources. In a packet-based network, such as the Internet, the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, which in turn may be geographically distributed over a wide area. Each site network may include one or more local area networks (LANs). Virtual private networks (VPNs) are often used to securely share data between site networks over a public network, such as the Internet. As one example, VPNs encapsulate and transport layer three (L3) communications, such as Internet Protocol (IP) packets, between the remote sites via the public network.

One form of a VPN is generally referred to as "MPLS VPN" in which Multi-Protocol Label Switching (MPLS) routes are used as a transport mechanism. MPLS is a mechanism used to engineer traffic patterns within IP networks. By utilizing MPLS, a source device can request a path through a network to a destination device, i.e., a Label Switched Path (LSP), to carry MPLS packets from the source device to a destination device. Each router along an LSP allocates a label and propagates the label to the closest upstream router along the path for use in forwarding MPLS packets along the path. Routers along the path cooperatively perform MPLS operations to forward the MPLS packets along the established path.

An MPLS VPN combines the tunneling processes of MPLS with virtual routing and forwarding (VRF) and features of border gateway protocol (BGP) to create a VPN. When a VPN is established within a network, devices for the VPN each include VPN-specific VRF tables. Routers involved in VPN-communications for an enterprise (e.g., provider edge (PE) routers or routers at the edge of a service provider network) maintain distinct virtual routing and forwarding VRF tables for each customer VPN, thereby providing a degree of logical isolation of routing and forwarding information for each different VPN. Additional details regarding VPNs, specifically VPNs implemented using BGP and MPLS are discussed in E. Rosen and Y. Rekhter, "BGP/MPLS IP Virtual Private Networks (VPNs)," RFC 4364, February 2006, available at http://tools.ietf.org/html/rfc4364, and L. Andersson and T. Madsen, "Provider Provisioned Virtual Private Network (VPN) Terminology," RFC 4026, March 2005, available at http://tools.ietf.org/html/rfc4026, the entire contents of each of which are incorporated herein by reference.

In some cases, a VPN may be configured to carry L3 multicast traffic, such as Internet Protocol Television (IPTV), desktop conferences, corporate broadcasts, music and video web cases, and other forms of multimedia content. If a particular BGP/MPLS IP VPN is transmitting "native" multicast traffic over the backbone, it is referred to as a Multicast VPN (MVPN). "Native" multicast traffic typically refers to packets that a customer edge (CE) router sends to a provider edge (PE) router in which the IP destination address of the packets is a multicast group address, or the packets are multicast control packets (e.g., join messages) addressed to the PE router itself, or the packets are IP multicast data packets encapsulated in MPLS. Further details of MVPNs are described in Internet Engineering Task Force, "Multicast in MPLS/BGP IP VPNs," Internet Draft, DRAFT-IETF-L3VPN-2547BIS-MCAST-10, Jan. 28, 2010, available at http://tools.ietf.org/html/draft-ietf-13vpn-2547bis-mcast-10, the entire contents of which are incorporated herein by reference.

Multicast traceroute (mtrace) is a multicast facility that traces the path of multicast traffic, such as the various types of L3 multicast traffic described above, from a particular source to a particular destination. In general, the multicast path is determined by walking up the tree from the destination to the source, with each network device in the path adding a response block to an mtrace packet before forwarding the mtrace packet to the next upstream network device in the path (i.e., the next hop router, which is the device that is next closest to the source). The response blocks each contain the current network device's interface addresses and various packet statistics. When the mtrace packet reaches a first hop router, which is a router that is connected to the multicast source, the first hop router adds its own response block, and then returns the mtrace packet to the requesting device. The requesting device may then analyze the path of the multicast traffic based on the response blocks that were added to the mtrace packet by each of the hops in the multicast path. In addition to tracing the path of multicast traffic, the mtrace facility can also be used to identify packet loss problems along the multicast path between a source and a destination, and/or to isolate configuration problems present in the multicast path. Further details of the multicast traceroute facility are described in W. Fenner and S. Casner, "A 'Traceroute' Facility for IP Multicast," Internet Draft, Feb. 11, 2005, available at http://tools.ietf.org/html/draft-fenner-traceroute-ipm-01, the entire contents of which are incorporated herein by reference.

SUMMARY

In general, this disclosure describes techniques for supporting multicast traceroute (mtrace) requests between different virtual private network (VPN) sites of an Internet Protocol (IP) VPN, such as a Multi-Protocol Label Switching/border gateway protocol (MPLS/BGP) VPN. Although the document entitled "A 'Traceroute' Facility for IP Multicast" generally describes a model for multicast traceroute, various features of the multicast traceroute facility, such as mtrace support over an MPLS/BGP IP MVPN, are not yet supported. For example, there is no native support for forwarding an mtrace request from an MVPN instance on an egress provider edge (PE) router to the corresponding MVPN instance on an ingress PE router because the upstream interface and IP address of the MVPN instance on the ingress PE router are not known to the egress PE router. As such, when using conventional mtrace processing, the multicast traceroute facility breaks at the egress PE router and the multicast traceroute request does not reach the first hop router, even though a multicast distribution path is present between the ingress and egress PE routers.

In accordance with the techniques described herein, to support mtrace over an MPLS/BGP IP MVPN, the egress PE router may, in some implementations, perform a route lookup to identify a label switched path from the egress PE router to the ingress PE router, and encapsulate the mtrace request packet in an MPLS label stack that identifies the MVPN instance of the ingress PE router using an inner MPLS label, and that identifies the path through the MPLS network using an outer MPLS label. The use of this MPLS label stack allows the encapsulated mtrace request packet to reach the ingress PE router, and more specifically, the appropriate MVPN instance of the ingress PE router. In addition, the egress PE router may add an IP header to the mtrace request packet, with the destination address of the IP header set to a localhost loopback IP address (e.g., 127.0.0.1 in IPv4 or ::1 in IPv6). The use of this localhost loopback IP address as the IP header destination of the mtrace request packet causes the mtrace request packet to be processed in the control plane of the ingress PE router.

The encapsulated mtrace request packet is forwarded through the MPLS network, e.g. via provider (P) routers, until the encapsulated mtrace request packet reaches the ingress PE router. The ingress PE router recognizes that the encapsulated packet is destined for itself, and in particular for the MVPN instance of the ingress PE router as identified by the inner MPLS label in the MPLS label stack. At the MVPN instance of the ingress PE router, the mtrace request packet is first processed at the forwarding plane of the router, and based on the localhost loopback destination address in the IP header, the packet is sent to the control plane, where it is processed according to standard mtrace request protocols (i.e., the ingress PE router adds a response block of its own to the mtrace request packet and then forwards the mtrace request packet to the next hop router in the multicast path, which in this instance is a customer edge (CE) router associated with the MVPN site where the source device resides). As such, according to the techniques described in this disclosure, the ingress and egress PE routers are configured to support multicast traceroute requests over an MPLS/BGP IP MVPN.

In one example, a method includes receiving, at a first network device that is associated with a multicast virtual private network (MVPN), a multicast traceroute message that identifies a source device that is associated with the MVPN and that is separated from the first network device by a multi-protocol label switching (MPLS) network. The method also includes determining a label switched path (LSP) from the first network device to a second network device that is associated with the MVPN and that is separated from the first network device by the MPLS network. The method further includes adding an Internet Protocol (IP) header to the multicast traceroute message. The IP header includes a destination address set to a localhost loopback IP address that causes the multicast traceroute message to be processed in a control plane of the second network device. The method also includes encapsulating the multicast traceroute message with an MPLS label stack that includes an inner MPLS label and an outer MPLS label, the MPLS label stack causing the encapsulated multicast traceroute message to reach an instance of the MVPN on the second network device. The method further includes transmitting the encapsulated multicast traceroute message from the first network device to the second network device via the LSP.

In another example, a computer-readable storage medium includes instructions that, when executed, cause a programmable processor to receive, at a first network device that is associated with a multicast virtual private network (MVPN), a multicast traceroute message that identifies a source device that is associated with the MVPN and that is separated from the first network device by a multi-protocol label switching (MPLS) network. The computer-readable storage medium also includes instructions to determine a label switched path (LSP) from the first network device to a second network device that is associated with the MVPN and that is separated from the first network device by the MPLS network. The computer-readable storage medium further includes instructions to add an Internet Protocol (IP) header to the multicast traceroute message. The IP header includes a destination address set to a localhost loopback IP address that causes the multicast traceroute message to be processed in a control plane of the second network device. The computer-readable storage medium further includes instructions to encapsulate the multicast traceroute message with an MPLS label stack includes an inner MPLS label and an outer MPLS label, the MPLS label stack causing the encapsulated multicast traceroute message to reach an instance of the MVPN on the second network device. The computer-readable storage medium also includes instructions to transmit the encapsulated multicast traceroute message from the first network device to the second network device via the LSP.

In another example, a routing device includes a first interface configured to receive a multicast traceroute message that identifies a source device that is associated with a multicast virtual private network (MVPN) with which the routing device is associated. The identified source device is separated from the routing device by a multi-protocol label switching (MPLS) network. The routing device also includes a routing engine configured to determine a label switched path (LSP) to a network device that is associated with the MVPN and that is separated from the routing device by the MPLS network, and to encapsulate the multicast traceroute message with an MPLS label stack that includes an inner MPLS label and an outer MPLS label. The MPLS label stack causes the encapsulated multicast traceroute message to reach an instance of the MVPN on the network device. The routing device further includes an mtrace support module configured to add an Internet Protocol (IP) header to the multicast traceroute message. The IP header includes a destination address set to a localhost loopback IP address that causes the multicast traceroute message to be processed in a control plane of the network device. The routing device also includes a second interface configured to transmit the multicast traceroute message to the network device via the LSP.

In another example, a system includes a first network device that is associated with a multicast virtual private network (MVPN). The system also includes a second network device that is associated with the MVPN and that is separated from the first network device by a multi-protocol label switching (MPLS) network. In the system, the first network device receives a multicast traceroute message that identifies a source device that is associated with the MVPN and that is separated from the first network device by the MPLS network. The first network device also determines a label switched path (LSP) from the first network device to the second network device. The first network device further adds an Internet Protocol (IP) header to the multicast traceroute message. The IP header includes a destination address set to a localhost loopback IP address that causes the multicast traceroute message to be processed in a control plane of the second network device. The first network device also encapsulates the multicast traceroute message with an MPLS label stack that includes an inner MPLS label and an outer MPLS label. The MPLS label stack causes the encapsulated multicast traceroute message to reach an instance of the MVPN on the second network device. The first network device further transmits the encapsulated multicast traceroute message from the first network device to the second network device via the LSP. In the system, the second network device receives the encapsulated multicast traceroute message transmitted from the first network device, determines that the encapsulated multicast traceroute message is destined for the instance of the MVPN on the second network device based on the MPLS label stack of the MPLS encapsulated multicast traceroute message, and transmits the multicast traceroute message to the control plane of the second network device based on the IP header of the multicast traceroute message.

In another example, a method includes receiving, at a second network device that is associated with a multicast virtual private network (MVPN), a multi-protocol label switching (MPLS) encapsulated multicast traceroute message sent from a first network device that is associated with the MVPN. The multicast traceroute message identifies a source device that is associated with the MVPN and that is separated from the first network device by an MPLS network. The method also includes determining that the MPLS encapsulated multicast traceroute message is destined for an instance of the MVPN on the second network device based on an MPLS label stack of the MPLS encapsulated multicast traceroute message. The method further includes transmitting the multicast traceroute message to a control plane of the second network device based on an Internet Protocol (IP) header of the multicast traceroute message. The IP header includes a destination address set to a localhost loopback IP address.

Various implementations of the previous examples can include any, all, or none of the following features. An outer label of the MPLS label stack can be based on a label switched path (LSP) from the first network device to the second network device, and the inner label can be based on the instance of the MVPN on the second network device. The inner label can include information that is used to identify a virtual routing and forwarding (VRF) table that corresponds to the instance of the MVPN on the second network device. The LSP can be determined by the first network device performing a unicast route lookup towards the source device. The localhost loopback IP address can be 127.0.0.1 in IP version 4 (IPv4), or ::1 in IP version 6 (IPv6). The first and second network devices can be provider edge routing devices.

The details of one or more examples are set forth in the accompanying drawings and the description below. Other features, objects, and advantages will be apparent from the description and drawings, and from the claims.

DETAILED DESCRIPTION

Figure 1:
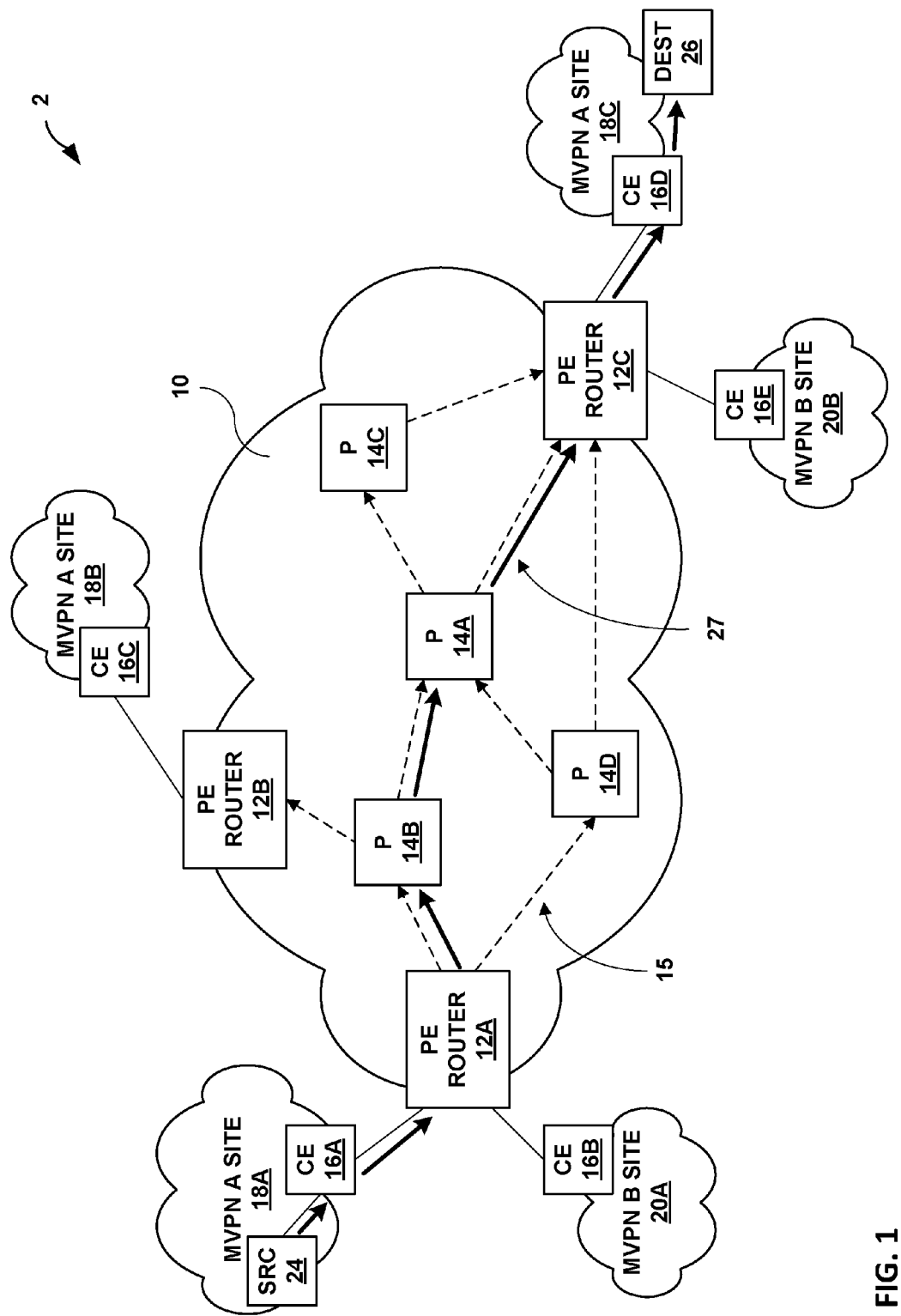
FIG. 1 is a block diagram illustrating an example computer network in which provider edge (PE) routers support multicast traceroute between different VPN sites of a MPLS/BGP IP VPN.

FIG. 1 is a block diagram illustrating an example computer network in which provider edge (PE) routers support multicast traceroute between different VPN sites of a MPLS/BGP IP VPN. The example computer network 2 includes a service provider network 10 in which provider edge (PE) routers 12A-12C ("PE routers 12") support at least one multicast virtual private network (MVPN). In the illustrated embodiment, PE router 12A sets up a multicast distribution tree 15 across service provider network 10 to provide layer three (L3) multicast service between PE routers 12. For example, multicast distribution tree 15 may include one or more service provider tunnels that transport L3 multicast traffic from a multicast source device 24 in customer site 18A of MVPN A to one or more subscriber devices (also termed receivers or destination devices), e.g., destination device 26, within at least one of the customer sites 18B, 18C of MVPN A.

One particular path showing multicast traffic being distributed from multicast source device 24 to destination device 26 is shown using bolded arrows in FIG. 1. In this particular path, PE router 12A operates as an ingress router to the service provider tunnel, and PE router 12C operate as an egress router. Similarly, PE router 12A may use service provider tunnels to transport multicast traffic from source device 24 to other receivers in MVPN A site 18C or to receivers in MVPN A site 18B (e.g., via PE router 12B). PE router 12A may also use service provider tunnels to transport multicast traffic from sources within MVPN B site 20A to receivers in MVPN site 20B (e.g., via PE router 12C). In other embodiments, multicast distribution trees may be set up by any one of PE routers 12.

In some cases, service provider network 10 may comprise a multi-protocol label switching (MPLS) network. Each of the MVPN sites may include a local area network (LAN) or a wide area network (WAN) that comprises a plurality of subscriber devices, such as desktop computers, laptops, workstations, PDAs, wireless devices, network-ready appliances, file servers, print servers, and/or other appropriate network devices.

Each of PE routers 12 couples to one or more of the MVPN sites via customer edge (CE) routers 16A-16E ("CE routers 16"). For example, PE router 12A is coupled to MVPN A site 18A and MVPN B site 20A via CE router 16A and CE router 16B, respectively. PE router 12B is coupled to MVPN A site 18B via CE router 16C. PE router 12C is coupled to MVPN A site 18C and MVPN B site 20B via CE router 16D and CE router 16E, respectively. Multicast distribution tree 15 couples PE routers 12 to each other via provider (P) routers 14A-14D ("P routers 14"), which represent core routers within service provider network 10.

In the illustrated embodiment, MVPN A and MVPN B, which are established across service provider network 10, are capable of carrying high bandwidth multicast traffic. For example, MVPN A and MVPN B may carry L3 multicast traffic, such as Internet Protocol Television (IPTV), desktop conferences, corporate broadcasts, music and video web casts, and other forms of multimedia content, from multicast source device 24 to subscriber devices within the MVPN A sites, e.g., destination device 26, and among sources and receivers within the MVPN B sites. PE router 12A may set up multicast distribution tree 15 across service provider network 10 to transport customer multicast data with one of a variety of tunneling technologies. For example, multicast distribution tree 15 may be set up by PE router 12A using Protocol Independent Multicast (PIM) or non-PIM protocols, such as MPLS protocols. MPLS protocols include the label distribution protocol (LDP) and the resource reservation protocol (RSVP), which may be extended to include traffic engineering (TE). In the case of PE router 12A using RSVP-TE, multicast distribution tree 15 may comprise a point-to-multipoint (P2MP) label switched path (LSP). Further details regarding the use of P2MP LSPs for MVPNs are described in "Multicast Data Trees For Multicast Virtual Private Networks," by Rahul Aggarwal, Yakov Rekhter and Anil Lohiya, U.S. Pat. No. 7,564,806, the entire contents of which are incorporated herein by reference.

As one example of multicast traffic being sent across an MPLS network, the following description explains how an MPLS packet traverses the MPLS network, from one PE router to another, and on to the appropriate CE router of the MVPN. At the ingress, PE router 12A encapsulates packets intended to be tunneled across a tunnel to CE router 16D with the labels corresponding to the tunnel (e.g., labels corresponding to P routers 14B, 14A for example), while CE router 16D decapsulates packets of the tunnel and forwards the decapsulated packets to their ultimate destinations.

In one example, PE router 12A encapsulates packets for a tunnel using two labels, an outer label and an inner label. The outer label (e.g., a generic routing encapsulation (GRE) label) represents a segment of the tunnel maintained by devices of service provider network 10 (PE devices 12A, 12C, and provider routers 14B, 14A, in the example of FIG. 1), while the inner label comprises a VPN-specific label, used by PE router 12C to forward the packet to the tunnel egress (e.g., remote CE device 16D, in the example of FIG. 1). PE router 12C removes the outer label from an incoming packet of the tunnel and forwards the packet comprising only the inner label to CE device 16D. CE device 16D ultimately decapsulates the inner labels from packets of the tunnel and forwards the packets toward their respective destinations, e.g., destination device 26.

For example, PE router 12A may initially receive a packet from a CE device, e.g., CE device 16A, to be admitted to a tunnel across service provider network 10. PE router 12A performs a lookup on the received packet to determine whether any or all of the services provided by PE router 12A are to be applied to the packet. PE router 12A, in some examples, maintains a table or other data structure that includes entries corresponding to a port on which a packet is received, a destination address of the packet, and indications of each service to be applied to a packet matching the port and the destination address. In the example of FIG. 1, an entry in such a table specifies that when a packet is received on a particular port with a destination of CE device 16D, PE router 12A is to perform a tunneling service to CE device 16D. In this manner, L3 multicast traffic is sent from a source device to one or more destination devices.

In various situations, it may be useful to trace the path of such multicast traffic from the source device to a particular destination. In general, a trace may be accomplished using the multicast traceroute facility (mtrace), which determines a multicast path by walking up the multicast distribution tree from the destination to the source, with each network device in the path adding a response block to the mtrace packet before forwarding the mtrace packet to the next upstream network device in the path (i.e., the next hop router, which is the device that is next closest to the source). However, when an mtrace request encounters an MPLS/BGP IP MVPN network at some point in the multicast distribution path, the mtrace request cannot be forwarded from an MVPN instance on an egress provider edge (PE) router to the corresponding MVPN instance on an ingress PE router (e.g., the next hop router) because the upstream interface and IP address of the MVPN instance on the ingress PE router are not known to the egress PE router. As such, when using conventional mtrace processing, the multicast traceroute facility fails at the egress PE router, and the multicast traceroute request will not reach the first hop router even though a multicast distribution path is present between the ingress and egress PE routers.

According to the techniques of this disclosure, the multicast traceroute facility can be used to trace the path of such multicast traffic from the source device to a particular destination, even when the source and the destination are separated by an MPLS network, e.g., service provider network 10, as shown in FIG. 1. As will be described in further detail below, to support mtrace over an MPLS/BGP IP MVPN, an egress PE router, e.g., egress PE router 12C, may perform a route lookup towards the source of the multicast traffic to identify a label switched path from the egress PE router to an ingress PE router, e.g., ingress PE router 12A. The route lookup may identify a label switched path through service provider network 10, e.g., via P routers 14A and 14B. After receiving the mtrace request packet, egress PE router 12C encapsulates the mtrace request packet using an MPLS label stack that identifies the MVPN instance of ingress PE router 12A as the next hop router in the mtrace path using an inner MPLS label. The MPLS label stack also identifies the upstream router in service provider network 10 (e.g., P router 14A) using an outer MPLS label. The use of such an MPLS label stack allows the encapsulated mtrace request packet to reach the appropriate MVPN instance of ingress PE router 12A over the MPLS network. In addition, egress PE router 12C adds an IP header to the mtrace request packet, with the destination address of the IP header set to a localhost loopback IP address (e.g., 127.0.0.1 in IPv4 or ::1 in IPv6) of ingress PE router 12A. The use of this localhost loopback IP address as the IP header destination of the mtrace request packet causes the mtrace request packet to be processed in the control plane of ingress PE router 12A.

The encapsulated mtrace request packet is forwarded through the MPLS network, e.g. via one or more P routers, until the encapsulated mtrace request packet reaches ingress PE router 12A. Ingress PE router 12A recognizes that the encapsulated packet is destined for itself, and in particular for the MVPN instance of ingress PE router 12A as identified by the inner MPLS label in the MPLS label stack. At the MVPN instance of ingress PE router 12A, the mtrace request packet is first processed at the forwarding plane of the router, and based on the localhost loopback destination address in the IP header, the mtrace request packet is sent to the control plane, where it is processed according to standard mtrace request protocols (i.e., by adding a response block to the mtrace request packet and then forwarding the mtrace request packet to the next hop router in the multicast path, e.g., CE router 16A). As such, according to the techniques described in this disclosure, ingress and egress PE routers 12A, 12C are configured to support multicast traceroute requests over an MPLS/BGP IP MVPN.

Figure 2:
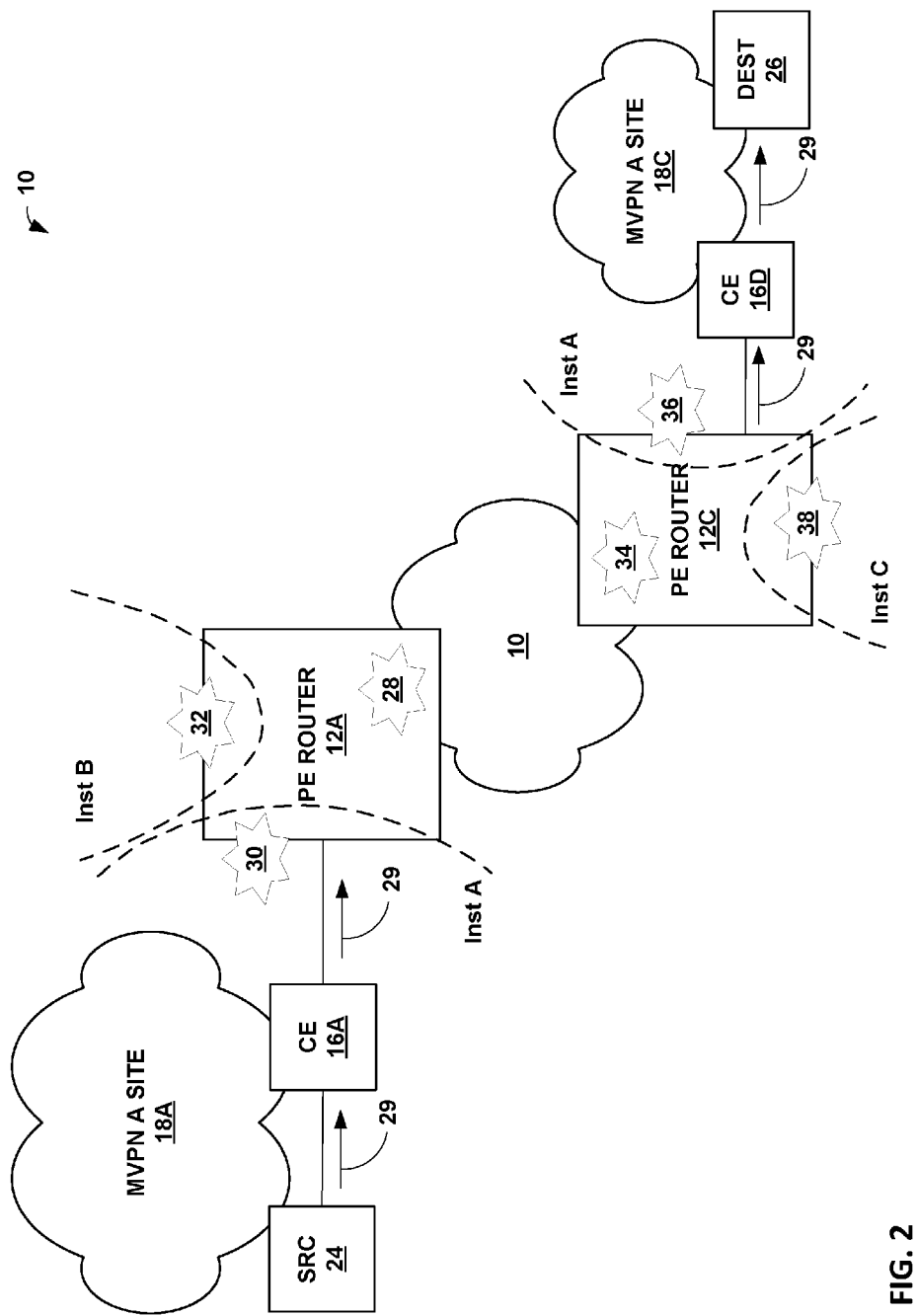
FIG. 2 is a block diagram illustrating a portion of the service provider network of FIG. 1 in further detail when supporting multicast traceroute over the MPLS/BGP IP VPN.

FIG. 2 is a block diagram illustrating a portion of the service provider network 10 of FIG. 1 in further detail when supporting multicast traceroute over the MPLS/BGP IP VPN. For ease of illustration, FIG. 2 depicts interaction of PE routers 12A and 12C of service provider network 10 with respect to MVPN A, although it is understood that the principles described herein can be implemented by other PE routers (12B, for example) and with respect to multiple MVPNs. In this example, source device 24 outputs multicast data 29 for a particular multicast group <S,G> to be distributed to one or more destination devices, including destination device 26.

Each of PE routers 12A, 12C includes a virtual routing and forwarding (VRF) table for each MVPN to which it has membership. VRF tables are used to store information related to how a particular packet arriving on a particular interface is to be handled and forwarded by the PE router. For example, when a PE router receives an MPLS encapsulated packet, the router performs a lookup in the appropriate VRF table, based on the labels in the MPLS label stack, which identify the instance of the MVPN to which the packet is addressed. The PE router uses the label or header information of the encapsulated packet as an index to the appropriate VRF table, and processes the packet according to the information contained in the VRF table.

As shown in the diagram, PE router 12A has membership to two MVPN instances, with Instance A being associated with VRF table 30, and Instance B being associated with VRF table 32. Similarly, PE router 12C has membership to two MVPN instances, with Instance A being associated with VRF table 36, and Instance C being associated with VRF table 38. In addition, PE routers 12A, 12C also each have a default instance, which is not associated with any particular customer MVPN, but rather is associated with the router itself. This default instance is also associated with a default VRF table, e.g., default VRF table 28 on PE router 12A and default VRF table 34 on PE router 12C.

PE routers 12 advertise their MVPN membership, e.g., the VRFs configured for multicast, to the other PE routers 12 using the border gateway protocol (BGP). In this manner, each of PE routers 12 in service provider network 10 have a complete view of the MVPN memberships of the other PE routers. However, each of PE routers 12 maintain distinct VRF tables for each customer MVPN, which provides a degree of logical isolation of routing and forwarding information for each different MVPN. For example, Instance A on PE router 12A shares a common address space with Instance A on PE router 12C, such that devices associated with MVPN A, whether they are in MVPN A site 18A or MVPN A site 18C, can communicate with one another. But the logical separation between the VRFs prevents any communication between non-shared address spaces, e.g., Instance B on PE router 12A and Instance A on PE routers 12A, 12C.

According to the techniques of this disclosure, to support mtrace over an MPLS network, e.g., service provider network 10, an egress PE router, should be able to send an mtrace packet received within a particular MVPN instance, e.g., Instance A of PE router 12C, to the corresponding MVPN instance of the ingress PE router, e.g., Instance A of PE router 12A. Furthermore, once the mtrace packet is routed to the appropriate MVPN instance of the ingress PE router, the router should process the mtrace packet in the control plane of the device. These techniques are described in further detail below.

Figure 3:
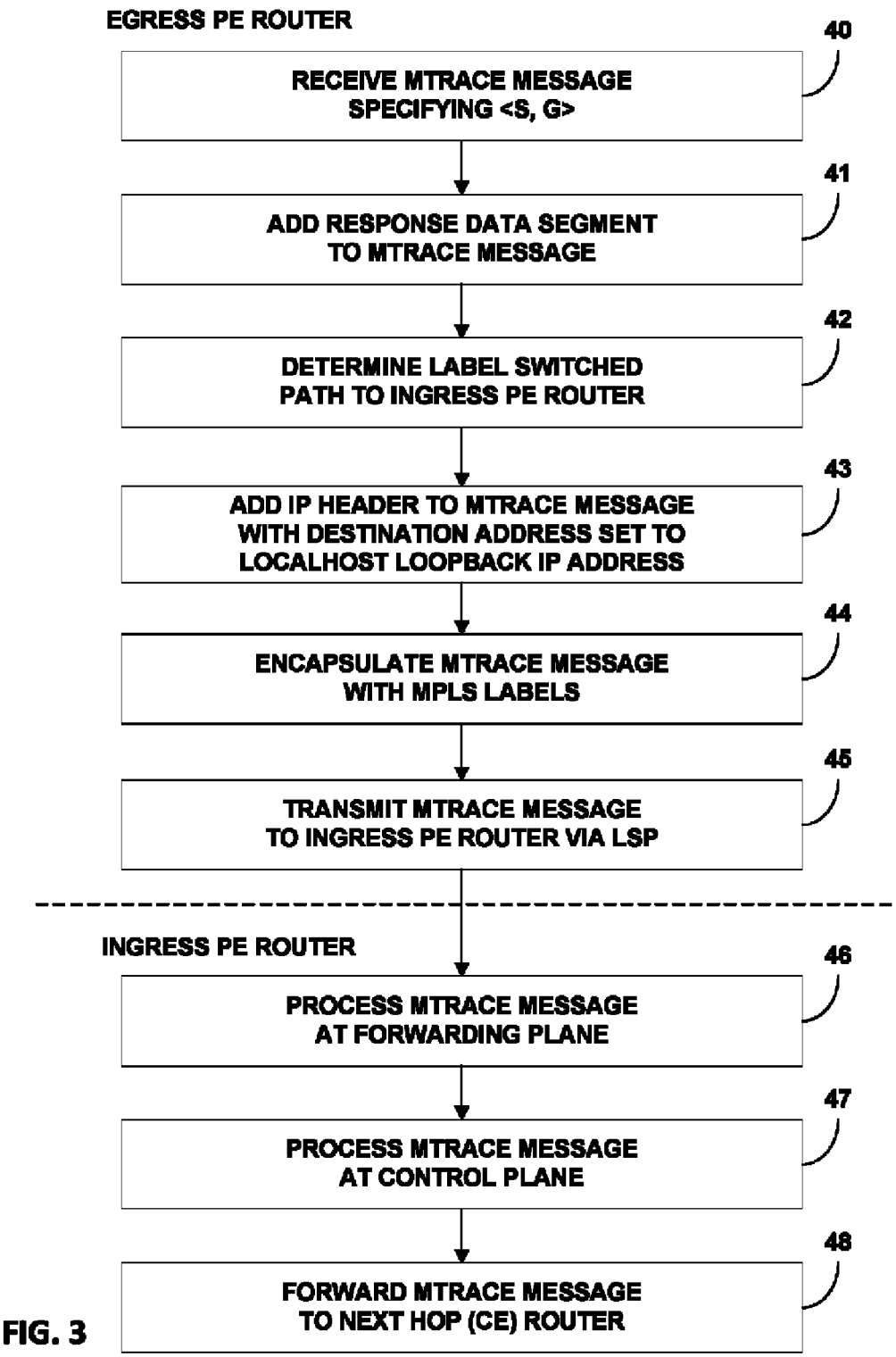
FIG. 3 is a flowchart illustrating example operations of an egress PE router and an ingress PE router of an MPLS/BGP IP VPN to support multicast traceroute.

FIG. 3 is a flowchart illustrating example operation of an egress PE router and an ingress PE router of an MPLS/BGP IP VPN to support multicast traceroute. The other network devices in the multicast distribution tree may receive, process, and forward the multicast traceroute messages according to known techniques, such as those described in W. Fenner and S. Casner, "A 'Traceroute' Facility for IP Multicast." However, to support multicast traceroute over an MPLS/BGP IP VPN according to the techniques described in this disclosure, the PE routers are configured to forward a multicast traceroute request from an MVPN instance of an egress PE router to the corresponding MVPN instance of an ingress PE router, and to ensure that the multicast traceroute request is processed in the control plane of the ingress PE router.

The operation begins when an egress PE router, e.g., PE router 12C in FIGS. 1 and 2, receives an mtrace message specifying a source and a group (40). In some implementations, an mtrace message may only specify a particular source rather than specifying both the source and the group. The egress PE router adds a response data segment to the mtrace message (41). This response data segment includes information about the egress PE router's interfaces, and may also include various other packet statistics. A completed response data segment may also be referred to as a response block.

The egress PE router determines a label switched path across the MPLS network to the ingress PE router (42). More specifically, the egress PE router determines a path to the appropriate MVPN instance of the ingress PE router. In some implementations, this determination is accomplished by performing a route lookup, e.g., a unicast route lookup, towards the source device from the MVPN instance of the egress PE router.

The egress PE router adds an Internet Protocol (IP) header to the mtrace message, with the destination address set to a localhost loopback IP address (43). For example, in IP version 4 (IPv4), the IP address for a localhost loopback is 127.0.0.1. As another example, in IP version 6 (IPv6), the IP address for a localhost loopback is ::1. Setting the destination address to the localhost loopback IP address causes the mtrace message to be processed in the control plane of the ingress PE router.

The egress PE router encapsulates the mtrace message with an MPLS label stack that causes the encapsulated mtrace message to reach the appropriate instance of the MVPN on the ingress PE router (44). The MPLS label stack includes at least an inner MPLS label and an outer MPLS label. The outer MPLS label is based on the label switched path that was determined as described above. The inner MPLS label is based on the instance of the MVPN on the ingress PE router. In some implementations, the inner MPLS label may include information that is used to identify a VRF table corresponding to the instance of the MVPN on the ingress PE router. The egress PE router then transmits the encapsulated mtrace message to the ingress PE router via the determined LSP (45).

When the ingress PE router receives the encapsulated mtrace message, it processes the message at the forwarding plane (46). For example, in the forwarding plane, the outer MPLS label, which identifies the ingress PE router as the destination of the encapsulated mtrace message, is stripped from the MPLS label stack. The ingress PE router then examines the inner MPLS label, which uniquely identifies the instance of the MVPN on the ingress PE router, and loops the packet back into the context of the MVPN instance on the ingress PE router.

The ingress PE router then performs a route lookup in the VRF of the MVPN instance based on the destination address in the IP header of the mtrace packet, which is set to a localhost loopback address. The localhost loopback address causes the mtrace packet to be processed at the control plane of the ingress PE router (47). The processing that occurs at the control plane includes adding a response block to the mtrace packet, and applying an IP header with an IP destination address specifying the next router in the multicast traffic path. After adding the response block and applying the IP header, the mtrace packet is forwarded to the next hop router in the MVPN site, which is the CE router connected to the ingress PE router (48).

Figure 4:
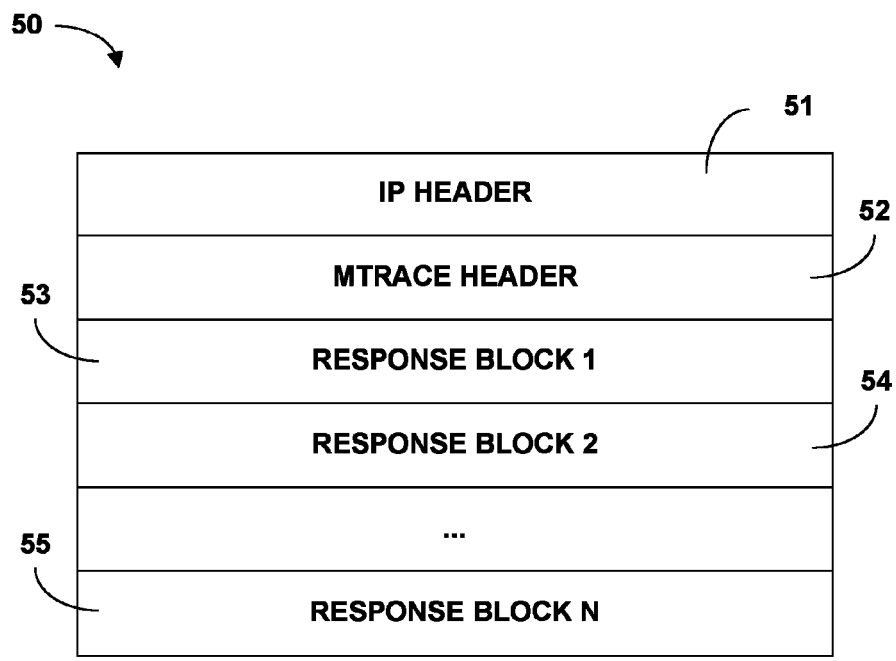
FIG. 4 illustrates an example multicast traceroute packet.

FIG. 4 illustrates an example multicast traceroute packet 50. The techniques described herein describe how multicast traceroute packet 50 is built up as it traverses a backwards path from a destination device that receives multicast traffic, e.g., destination device 26 of FIG. 2, back towards the source of the multicast traffic, e.g., source device 24 of FIG. 2. In this example, multicast traceroute packet 50 includes an IP header 51, an mtrace header 52, and multiple response blocks 53-55.

In standard multicast traceroute operations, IP header 51 identifies the IP destination address corresponding to the next hop router for which multicast traceroute packet 50 is destined. As each device in the multicast distribution path determines the address of the next hop router, IP header 51 is updated such that when multicast traceroute packet 50 is forwarded along, it traverses the path from the present device to the next hop router. However, according to the techniques described in this disclosure, when an egress PE router receives multicast traceroute packet 50, rather than addressing IP header 51 to a next hop router, the egress PE router sets the IP header destination address to a localhost loopback address (e.g., 127.0.0.1 in IPv4 or ::1 in IPv6). This causes multicast traceroute packet 50 to be processed in the control plane of the ingress PE router after the packet traverses the MPLS network separating the ingress and egress PE routers.

Mtrace header 52 is generated by an originator of the traceroute query, e.g., destination device 26 of FIG. 2, and is not modified by any of the intermediate hops along the multicast traffic path that it traverses. Mtrace header 52 includes information such as a multicast group address that specifies the group address to be traced, a source address that specifies the IP address of the multicast source for the path being traced, a destination address that specifies the IP address of the multicast receiver for the path being traced, and a response address that specifies where the completed traceroute response packet is to be sent (e.g., back to the originator of the query). Mtrace header 52 may also include other header information, such as the maximum number of hops that the requester wishes to trace, a unique identifier for the traceroute request, etc.

The originator of the traceroute query is not necessarily the destination device of the multicast traffic, but rather may be any device having access to the network over which the multicast traffic is being distributed. For example, an administrator using a computing device associated with MVPN A site 18C may generate a traceroute query that specifies destination device 26 even if the administrator's computing device is not within the path of the traffic flow being traced.

As described above, each of the hops along the multicast traffic path adds a response data segment to multicast traceroute packet 50 before the packet is forwarded on to the next hop router. These response data segments are shown as response blocks 53-56, where the first response block 53 is added by the first device in the path, the second response block 54 is added by the second device in the path, and the nth response block 55 is added by the nth device in the path. In this example, n is an integer corresponding to the number of devices that have received and processed multicast traceroute packet 50 along the path of the multicast traffic. When multicast traceroute packet 50 reaches the first hop router, n is equal to the number of devices in the path between the source device and the destination device specified in mtrace header 52. Each of response blocks 53-56 includes information corresponding to the path of the multicast traffic and statistics relating to the multicast traffic. For example, each of response blocks 53-56 includes a query arrival time, incoming and outgoing interface addresses, a previous hop router address, etc.

Figure 5:
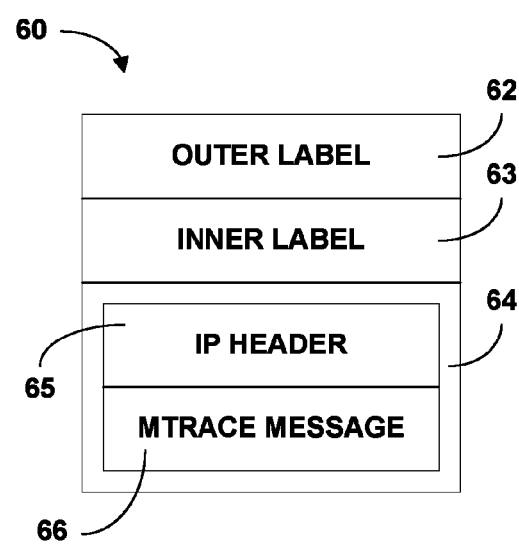
FIG. 5 illustrates an example MPLS encapsulated multicast traceroute packet.

FIG. 5 illustrates an example MPLS encapsulated multicast traceroute packet, which is sent between the ingress and egress PE routers via an MPLS network as described above. In this example, MPLS encapsulated packet 60 includes an outer MPLS label 62, an inner MPLS label 63, and an encapsulated payload 64. In the illustrated example, encapsulated payload 64 includes an IP header 65 and an mtrace message 66. Mtrace message 66 includes an mtrace header and any number of response blocks, corresponding to the number of network devices that have been traversed before mtrace message 66 reaches the egress PE router and is encapsulated in packet 60.

According to the techniques described in this disclosure, the egress PE router sets the destination address in IP header 65 to a localhost loopback address. As the encapsulated mtrace packet traverses the MPLS network between the ingress and egress PE routers, encapsulated payload 64 remains unexamined by the various P routers that forward the packet through the core, and therefore, the IP header destination address remains set to the localhost loopback address until the mtrace packet is processed by the ingress PE router.

The encapsulation of payload 64 by an MPLS label stack that includes outer MPLS label 62 and inner MPLS label 63 allows the mtrace message 66 to reach the appropriate instance of the MVPN on the ingress PE router. To generate the MPLS label stack, the egress PE router performs a route lookup towards the source to determine an LSP to the ingress PE router. An LSP defines a distinct path through an MPLS network to carry MPLS packets from a sender to a receiver-in this instance, from the egress PE router to the ingress PE router. Outer MPLS label 62 includes information that defines the LSP from the egress PE router to the ingress PE router, while inner MPLS label 63 identifies the appropriate MVPN instance on the ingress PE router. P routers along the path cooperatively perform MPLS operations to forward MPLS encapsulated packet 60 along the established path, and do not examine the encapsulated payload as the packet traverses the MPLS network.

When encapsulated packet 60 reaches the ingress PE router, the ingress PE router strips outer MPLS label 62 and performs a lookup of inner MPLS label 63 to determine the VRF context in which the ingress PE router should perform the customer data packet lookup. The ingress PE router then strips inner MPLS label 63, and based on the IP header 65 destination address set to a localhost loopback address, sends the mtrace message to the control plane of the ingress PE router.

Figure 6:
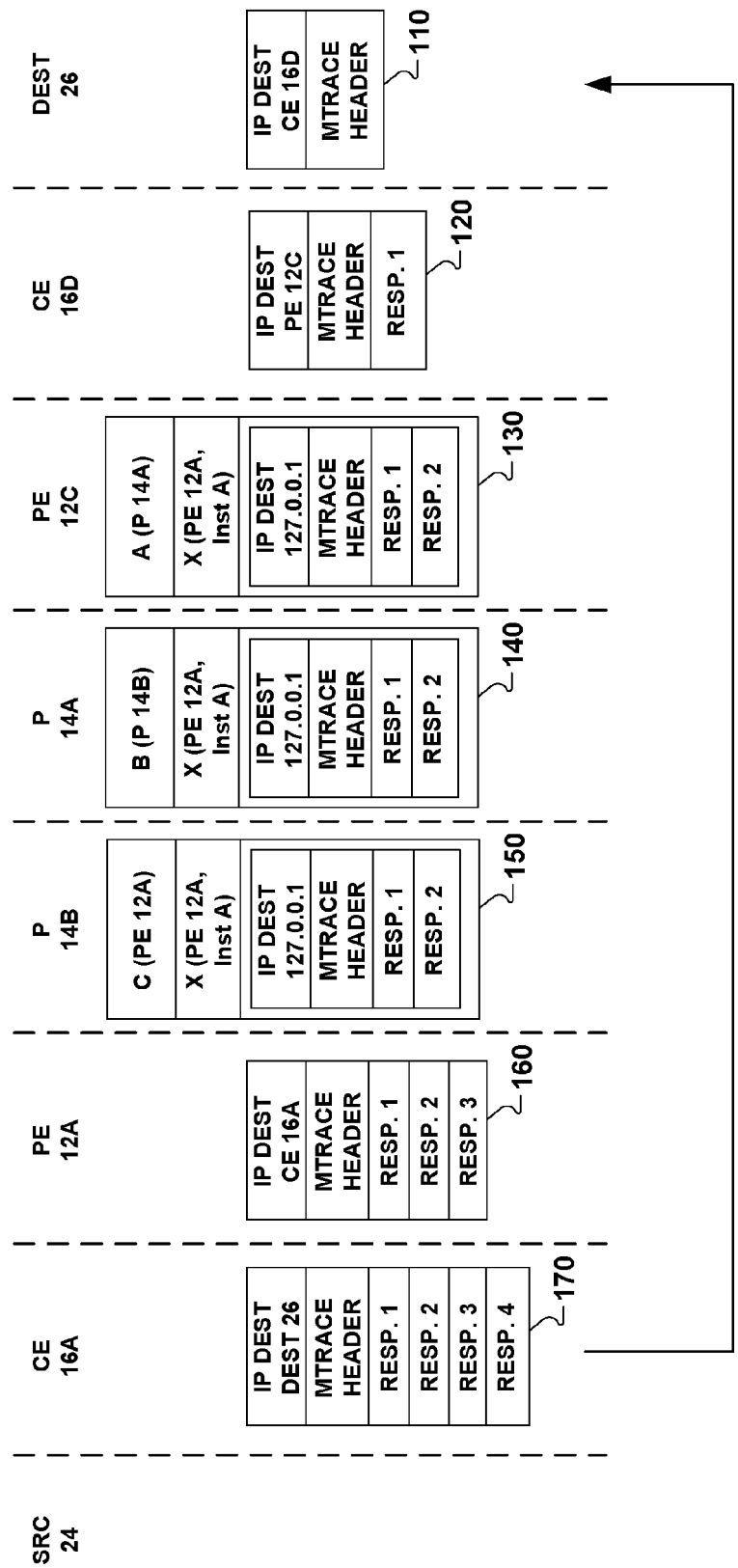
FIG. 6 is a conceptual diagram illustrating an example multicast traceroute packet as it is updated and forwarded by network devices in an MPLS/BGP IP VPN.

FIG. 6 is a conceptual diagram illustrating an example multicast traceroute packet as it is updated and forwarded by network devices in an MPLS/BGP IP VPN. For example, the diagram shows a multicast traceroute path that corresponds to the reverse route of the L3 multicast traffic shown using bold arrows in FIG. 1. As shown in FIG. 1, the multicast traffic is transmitted from source device 24 to destination device 26 along a path that includes CE router 16A, PE router 12A, P router 14B, P router 14A, PE router 12C, and CE router 16D. As described above, a multicast traceroute request packet specifying <S, G> travels up the path in reverse order, i.e., from destination device 26 back to source device 24.

As shown in the diagram, an mtrace query (as shown by the lack of a response block in mtrace packet 110) originates from destination device 26. However, any device in the network may also generate an mtrace query to determine the multicast path from source device 24 to destination device 26. In the case that a different device from the destination device generates the mtrace query, destination device 26 would change the mtrace query to an mtrace request and add a response block to packet 110 that includes information corresponding to destination device 26. Regardless of the origination of the mtrace query, destination device 26 adds an IP header to packet 110 indicating CE router 16D as the next hop router, and as such, the destination of packet 110. Destination device 26 then forwards packet 110 to the IP address of CE router 16D.

After receiving packet 110 from destination device 26, CE router 16D processes the mtrace query to form packet 120. CE router 16D changes the mtrace query into an mtrace request, and also adds a response block (shown here as response block 1) that includes various interface information and packet statistics. CE router 16D also adds an IP header to packet 120 indicating PE router 12C as the next hop router, and forwards packet 120 to the IP address of PE router 12C.

After receiving packet 120 from CE router 16D, PE router 12C processes the mtrace request to form encapsulated packet 130. PE router 12C adds its own response block (shown here as response block 2) to the mtrace request. PE router 12C also encapsulates the mtrace request using an MPLS label stack that allows the mtrace packet to reach the appropriate MVPN instance on PE router 12A. In particular, the MPLS label stack includes an outer MPLS label that corresponds to the LSP through the MPLS network. In the example of packet 130, the outer MPLS label identifies P router 14A as the first router in the path through the MPLS network. The MPLS label stack also includes an inner MPLS label that corresponds to Instance A on PE router 12A.

P router 14A receives encapsulated packet 130 from PE router 12C, and processes the packet according to standard MPLS procedures. In other words, P router 14A does not decapsulate packet 130 because packet 130 is not destined for P router 14A (as indicated by inner MPLS label X, which identifies Instance A on PE router 12A as the upstream router for which the packet is destined). Instead, P router 14A merely strips the outer label from encapsulated packet 130, determines that packet 130 is not destined for itself, and applies a new outer MPLS label that identifies P router 14B as the next router in the path through the MPLS network. This new outer MPLS label is added to the MPLS label stack to form encapsulated packet 140. Encapsulated packet 130 is not decapsulated, and therefore, nothing in the payload of the encapsulated packet is updated. I.e., P router 14A does not add a response block to the mtrace packet. After processing has completed, P router 14A forwards encapsulated packet 140 to P router 14B based on the newly applied MPLS outer label.

Similar to P router 14A, P router 14B receives encapsulated packet 140, and processes the packet according to standard MPLS procedures by stripping the outer label and applying a new outer label to form encapsulated packet 150, which indicates that the next router to receive the encapsulated packet is PE router 12A. Once again, nothing in the payload of encapsulated packet 140 is changed. P router 14B then forwards encapsulated packet 150 to PE router 12A based on the newly applied MPLS outer label.

PE router 12A receives encapsulated packet 150 from P router 14B. To process encapsulated packet 150, PE router 12A strips the outer MPLS label and examines the inner MPLS label. The inner MPLS label identifies the appropriate MVPN instance on PE router 12A (e.g., instance A). More specifically, the inner MPLS label is used to identify a virtual routing and forwarding (VRF) table that corresponds to the appropriate instance of the MVPN on PE router 12A.

PE router 12A transmits the mtrace packet to the control plane based on the IP destination address in the IP header of the mtrace packet, which was set to the localhost loopback address by PE router 12C. PE router 12A then processes the mtrace packet in the control plane according to standard mtrace procedures. For example, PE router 12A adds a new response block (shown here as response block 3) to the packet, and also applies an IP header with an IP destination address specifying the next router in the multicast traffic path (i.e., CE router 16A). This processing forms packet 160, which is then forwarded to CE router 16A.

After receiving packet 160 from PE router 12A, CE router 16A processes the mtrace request to form packet 170. CE router 16A adds its own response block (shown here as response block 4) to the mtrace request. Because CE router 16A is connected to source device 24, CE router 16A determines that it is the first hop router, and converts the mtrace request into an mtrace response packet. CE router 16A also applies an IP header with an IP destination address specifying the IP address of the device that originated the mtrace query, which in this example is destination device 26, and forwards the mtrace response packet back to the originating device where the packet can be analyzed to evaluate the path of the multicast traffic between source device 24 and destination device 26.

Figure 7:
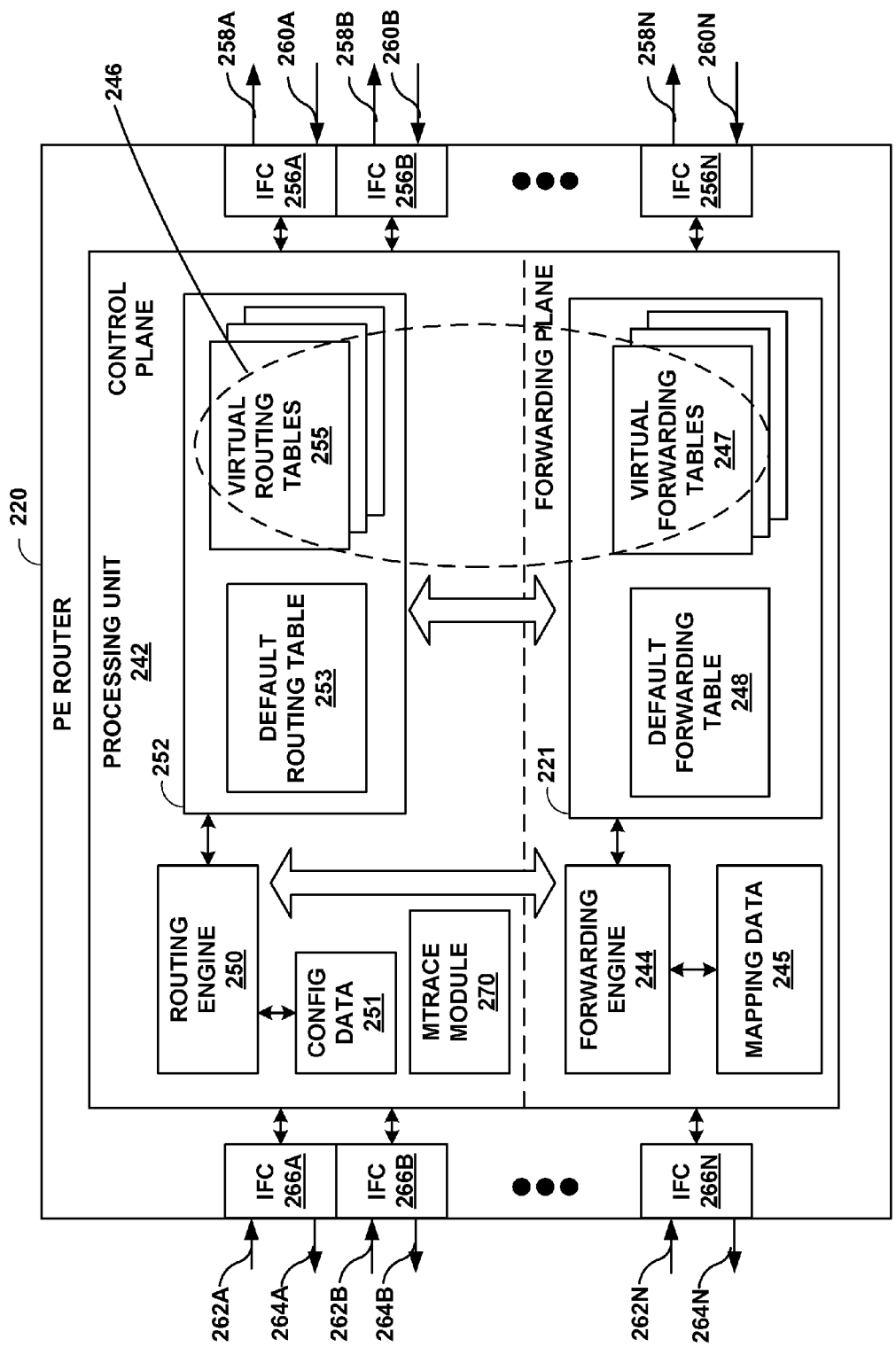
FIG. 7 is a block diagram illustrating an example PE router capable of supporting multicast traceroute over an MPLS/BGP IP VPN.

FIG. 7 is a block diagram illustrating an example PE router 220 capable of supporting multicast traceroute over an MPLS/BGP IP VPN. Any of PE routers 12A-12C may include components similar to those described with respect to PE router 220. In the example of FIG. 7, PE router 220 includes customer-facing interface cards 266A-266N (edge IFCs 266) for communicating packets via inbound links 262A-262N ("inbound links 262") and outbound links 264A-264N ("outbound links 264"). PE router 220 also includes core-facing interface cards 256A-256N ("core-facing IFCs 256") for communicating packets via outbound links 258A-258N ("outbound links 258") and inbound links 260A-260N ("inbound links 260"). Core-facing IFCs 256 are coupled to outbound links 258 and inbound links 260, and edge IFCs 266 are coupled to inbound links 262 and outbound links 264, via a number of interface ports (not shown). Each of core-facing IFCs 256 are coupled to a respective network device of service provider network 10, while each of edge IFCs 266 are coupled to a respective customer edge network device, any or all of which may belong to distinct customers. It should be understood that the letter "N" is used to represent an arbitrary number of devices, and moreover, that the number of edge IFCs 266 is not necessarily equal to the number of core-facing IFCs 256, although the cardinality for both IFCs 256 and 266 is designated using the variable "N."

PE router 220 also includes processing unit 242. Processing unit 242 includes forwarding engine 244, forwarding information base (FIB) 221, routing engine 250, and routing information base (RIB) 252. Forwarding information base 221 includes default forwarding table 248 and virtual forwarding tables 247, while routing information base 252 includes default routing table 253 and virtual routing tables 255. Together, virtual routing tables 255 and virtual forwarding tables 247 form virtual routing and forwarding (VRF) tables 246, as conceptually indicated by the dashed ellipse circumscribing virtual routing tables 255 and virtual forwarding tables 247. Each of VRF tables 246 includes a distinct one of virtual routing tables 255 and virtual forwarding tables 247. Each of VRF tables 246 corresponds to a particular routing instance. A default routing instance corresponds to default routing table 253 and default forwarding table 248.

Processing unit 242 may be implemented in hardware, software, firmware, or any combination thereof. In one example, instructions for forwarding engine 244 are encoded in a computer-readable storage medium and are executed by a processor of processing unit 242. In other examples, forwarding engine 244 corresponds to a discrete hardware unit, such as a digital signal processor (DSPs), application specific integrated circuit (ASICs), field programmable gate array (FPGAs), or any other equivalent integrated or discrete logic circuitry or combination thereof. Similarly, routing engine 250 comprises any combination of hardware, software, and/or firmware that executes one or more routing protocols to determine routes through a network. Routing engine 250 stores learned and calculated routes in RIB 252, where customer routes for the different VPNs provided by PE router 220 are stored in corresponding virtual routing tables 255 for generation of VPN-specific forwarding information within each of virtual forwarding tables 247. Each of VRF tables 246 associates tunnels to local CE devices with a respective one of edge IFCs 266 and tunnels to remote CE devices with a respective one of core-facing IFCs 256. Default forwarding table 248 associates tunnels to devices of service provider network 10 with one of core-facing IFCs 256. In this way, different routing instances are used to logically isolate the routing and forwarding information for different VPNs by using VRF tables 246. Each of VRF tables 246 and default forwarding table 248 is associated with a different one of the routing instances and, therefore, a respective localhost interface.

Processing unit 242 also stores configuration (config) data 251 and mapping data 245. Configuration data 251 is typically provided by an administrator to define the configuration data for PE router 220, including specifying the logical and physical interfaces of IFCs 256, 266. In addition, PE router 220 may generate configuration data 251 to define the set of default logical interfaces associated with each of the particular routing instances, i.e., the localhost interfaces for the different routing instances. A localhost interface is a logical interface associated with a particular routing instance. In the context of VPNs, processing unit 242 constructs and associates a localhost interface with each routing instance for each VPN, i.e., the corresponding one of virtual routing tables 255 for the VPN and the virtual forwarding table 247 generated therefrom. In accordance with the techniques of this disclosure, a localhost interface is always present for a particular routing interface, because processing unit 242 is configured to automatically generate a localhost interface associated with each of VRF tables 246 as VRF tables 246 are instantiated. Unlike other logical interfaces, a localhost interface is not associated with any physical interface, but is instead associated with a routing instance. In some examples, processing unit 242 generates identifiers associated with the localhost interface that are also related to the corresponding one of VRF tables 246. For example, a name of a localhost interface, in some examples, is enumerated with a numeric identifier that is common to the corresponding one of VRF tables 246.

Each of VRF tables 246 corresponds to a distinct routing instance for a respective VPN. Default routing table 248 also corresponds to a distinct routing instance, referred to as a default routing instance. In general, PE router 220 maintains a separate VRF table 246 for each VPN to which PE router 220 is connected. In accordance with the techniques of this disclosure, PE router 220 performs a route lookup in a specific one of VRF tables 246 to identify a route to a remote CE device, such as remote CE device 16A. That is, this disclosure recognizes that the label for a network tunnel to reach remote CE device 16A would not be found in default routing table 248. Moreover, this disclosure recognizes that in order for a packet to reach remote CE device 16A, the packet must traverse service provider network 10, and therefore, must be forwarded through one of core-facing IFCs 256. Therefore, to select one of core-facing IFCs to reach remote CE device 16A, PE router 220 performs a lookup in one of VRF tables 246 that is associated with a VPN comprising, e.g., CE device 16A and CE device 16D.

According to the techniques described in this disclosure, when an mtrace request packet is received by PE router 220 acting as an egress PE router, routing engine 250 is configured to determine a label switched path (LSP) through the MPLS network to an MVPN instance of an ingress PE router that is associated with the MVPN upon which the mtrace request packet was received. For example, if the destination device of the mtrace request packet is associated with MVPN instance A of PE router 220, then routing engine 250 determines the LSP to MVPN instance A of the corresponding ingress PE router, which includes the source of the multicast traffic. In some implementations, PE router 220 may determine the LSP based on a unicast route lookup towards the source device.

After determining the LSP through the MPLS network, routing engine 250 encapsulates the mtrace request packet with an MPLS label stack that includes an inner MPLS label and an outer MPLS label. The MPLS label stack causes the encapsulated multicast traceroute message to reach the appropriate instance of the MVPN on the ingress PE router.

For example, the outer MPLS label corresponds to the LSP through the MPLS network, and identifies the next hop P router in the core on the LSP to the ingress PE router. When the next hop P router receives the encapsulated mtrace request packet, the receiving P router then determines the next successive hop P router, and forwards the encapsulated mtrace request packet, and so on until the encapsulated mtrace request packet reaches the ingress PE router. The inner MPLS label corresponds to the appropriate MVPN instance on the ingress PE router as described above.

PE router 220 also includes mtrace module unit 270 to provide mtrace support over an MPLS/BGP IP MVPN. Mtrace module unit 270 operates in the control plane of PE router 220, and serves to update each received mtrace request packet with an IP header that sets the IP destination address to a localhost loopback address. The use of a localhost loopback address ensures that the mtrace request packet is handled by the control plane of the ingress PE router after traversing the MPLS network. Mtrace module unit 270 also adds a response block to each of the mtrace request packets. The response block contains certain interface address information of PE router 220 and various packet statistics, and may be updated according to known techniques.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" generally refers to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium generally cause a programmable processor, or other processor, to perform the method, e.g., when the instructions are executed. Computer readable storage media include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. In this sense, the computer-readable storage medium may comprise a non-transitory computer-readable storage medium.

Various examples have been described. These and other examples are within the scope of the following claims.

What is claimed is:

1. A method comprising:
receiving, at a first network device that is associated with a multicast virtual private network (MVPN), a multicast traceroute message that identifies a source device that is associated with the MVPN and that is separated from the first network device by a multi-protocol label switching (MPLS) network;
determining a label switched path (LSP) from the first network device to a second network device that is associated with the MVPN and that is separated from the first network device by the MPLS network;
adding an Internet Protocol (IP) header to the multicast traceroute message, the IP header comprising a destination address set to a localhost loopback IP address that causes the multicast traceroute message to be processed in a control plane of the second network device;
encapsulating the multicast traceroute message with an MPLS label stack comprising an inner MPLS label and an outer MPLS label, the MPLS label stack causing the encapsulated multicast traceroute message to reach an instance of the MVPN on the second network device; and
transmitting the encapsulated multicast traceroute message from the first network device to the second network device via the LSP.

2. The method of claim 1, wherein the MVPN comprises a border gateway protocol (BGP) MPLS IP MVPN.

3. The method of claim 1, wherein the outer label is based on the determined LSP, and wherein the inner label is based on the instance of the MVPN on the second network device.

4. The method of claim 3, wherein the inner label comprises information that is used to identify a virtual routing and forwarding (VRF) table that corresponds to the instance of the MVPN on the second network device.

5. The method of claim 1, wherein determining the LSP comprises performing a unicast route lookup towards the source device.

6. The method of claim 1, wherein the localhost loopback IP address is 127.0.0.1 in IP version 4 (IPv4).

7. The method of claim 1, wherein the localhost loopback IP address is ::1 in IP version 6 (IPv6).

8. The method of claim 1, wherein the first and second network devices are provider edge routing devices.

9. A non-transitory computer readable storage medium including instructions that, when executed, cause a programmable processor to:
receive, at a first network device that is associated with a multicast virtual private network (MVPN), a multicast traceroute message that identifies a source device that is associated with the MVPN and that is separated from the first network device by a multi-protocol label switching (MPLS) network;
determine a label switched path (LSP) from the first network device to a second network device that is associated with the MVPN and that is separated from the first network device by the MPLS network;
add an Internet Protocol (IP) header to the multicast traceroute message, the IP header comprising a destination address set to a localhost loopback IP address that causes the multicast traceroute message to be processed in a control plane of the second network device;
encapsulate the multicast traceroute message with an MPLS label stack comprising an inner MPLS label and an outer MPLS label, the MPLS label stack causing the encapsulated multicast traceroute message to reach an instance of the MVPN on the second network device; and
transmit the encapsulated multicast traceroute message from the first network device to the second network device via the LSP.

10. The computer readable storage medium of claim 9, wherein the MVPN comprises a border gateway protocol (BGP) MPLS IP MVPN.

11. The computer readable storage medium of claim 9, wherein the outer label is based on the determined LSP, and wherein the inner label is based on the instance of the MVPN on the second network device.

12. The computer readable storage medium of claim 11, wherein the inner label comprises information that is used to identify a virtual routing and forwarding (VRF) table that corresponds to the instance of the MVPN on the second network device.

13. The computer readable storage medium of claim 9, wherein determining the LSP comprises performing a unicast route lookup towards the source device.

14. The computer readable storage medium of claim 9, wherein the localhost loopback IP address is 127.0.0.1 in IP version 4 (IPv4).

15. The computer readable storage medium of claim 9, wherein the localhost loopback IP address is ::1 in IP version 6 (IPv6).

16. The computer readable storage medium of claim 9, wherein the first and second network devices are provider edge routing devices.

17. A routing device comprising:
a first interface configured to receive a multicast traceroute message that identifies a source device that is associated with a multicast virtual private network (MVPN) with which the routing device is associated, the source device being separated from the routing device by a multi-protocol label switching (MPLS) network;

a routing engine configured to determine a label switched path (LSP) to a network device that is associated with the MVPN and that is separated from the routing device by the MPLS network, and to encapsulate the multicast traceroute message with an MPLS label stack comprising an inner MPLS label and an outer MPLS label, the MPLS label stack causing the encapsulated multicast traceroute message to reach an instance of the MVPN on the network device;

an mtrace support module executed by hardware of the routing device configured to add an Internet Protocol (IP) header to the multicast traceroute message, the IP header comprising a destination address set to a localhost loopback IP address that causes the multicast traceroute message to be processed in a control plane of the network device; and a second interface configured to transmit the multicast traceroute message to the network device via the LSP.

18. A system comprising:

a first network device that is associated with a multicast virtual private network (MVPN); and a second network device that is associated with the MVPN and that is separated from the first network device by a multi-protocol label switching (MPLS) network;

wherein the first network device receives a multicast traceroute message that identifies a source device that is associated with the MVPN and that is separated from the first network device by the MPLS network, determines a label switched path (LSP) from the first network device to the second network device, adds an Internet Protocol (IP) header to the multicast traceroute message, the IP header comprising a destination address set to a localhost loopback IP address that causes the multicast traceroute message to be processed in a control plane of the second network device, encapsulates the multicast traceroute message with an MPLS label stack comprising an inner MPLS label and an outer MPLS label, the MPLS label stack causing the encapsulated multicast traceroute message to reach an instance of the MVPN on the second network device, and transmits the encapsulated multicast traceroute message from the first network device to the second network device via the LSP; and wherein the second network device receives the encapsulated multicast traceroute message transmitted from the first network device, determines that the encapsulated multicast traceroute message is destined for the instance of the MVPN on the second network device based on the MPLS label stack of the MPLS encapsulated multicast traceroute message, and transmits the multicast traceroute message to the control plane of the second network device based on the IP header of the multicast traceroute message.

19. A method comprising:

receiving, at a second network device that is associated with a multicast virtual private network (MVPN), a multi-protocol label switching (MPLS) encapsulated multicast traceroute message sent from a first network device that is associated with the MVPN, the multicast traceroute message identifying a source device that is associated with the MVPN and that is separated from the first network device by an MPLS network;

determining that the MPLS encapsulated multicast traceroute message is destined for an instance of the MVPN on the second network device based on an MPLS label stack of the MPLS encapsulated multicast traceroute message; and transmitting the multicast traceroute message to a control plane of the second network device based on an Internet Protocol (IP) header of the multicast traceroute message, the IP header comprising a destination address set to a localhost loopback IP address.

20. The method of claim 19, wherein the MVPN comprises a border gateway protocol (BGP) MPLS IP MVPN.

21. The method of claim 19, wherein an outer label of the MPLS label stack is based on a label switched path (LSP) from the first network device to the second network device, and wherein the inner label is based on the instance of the MVPN on the second network device.

22. The method of claim 21, wherein the inner label comprises information that is used to identify a virtual routing and forwarding (VRF) table that corresponds to the instance of the MVPN on the second network device.

23. The method of claim 21, wherein the LSP is determined by the first network device performing a unicast route lookup towards the source device.

24. The method of claim 19, wherein the localhost loopback IP address is 127.0.0.1 in IP version 4 (IPv4).

25. The method of claim 19, wherein the localhost loopback IP address is ::1 in IP version 6 (IPv6).

26. The method of claim 19, wherein the first and second network devices are provider edge routing devices.

* * * * *